Nov. 30, 1937.  A. N. SPÁNEL  2,100,571
METHOD OF AND APPARATUS FOR MAKING RUBBER OR LATEX ARTICLES
Original Filed Aug. 10, 1933    5 Sheets-Sheet 1

INVENTOR
ABRAHAM N. SPÁNEL
BY D. Clyde Jones
ATTORNEY

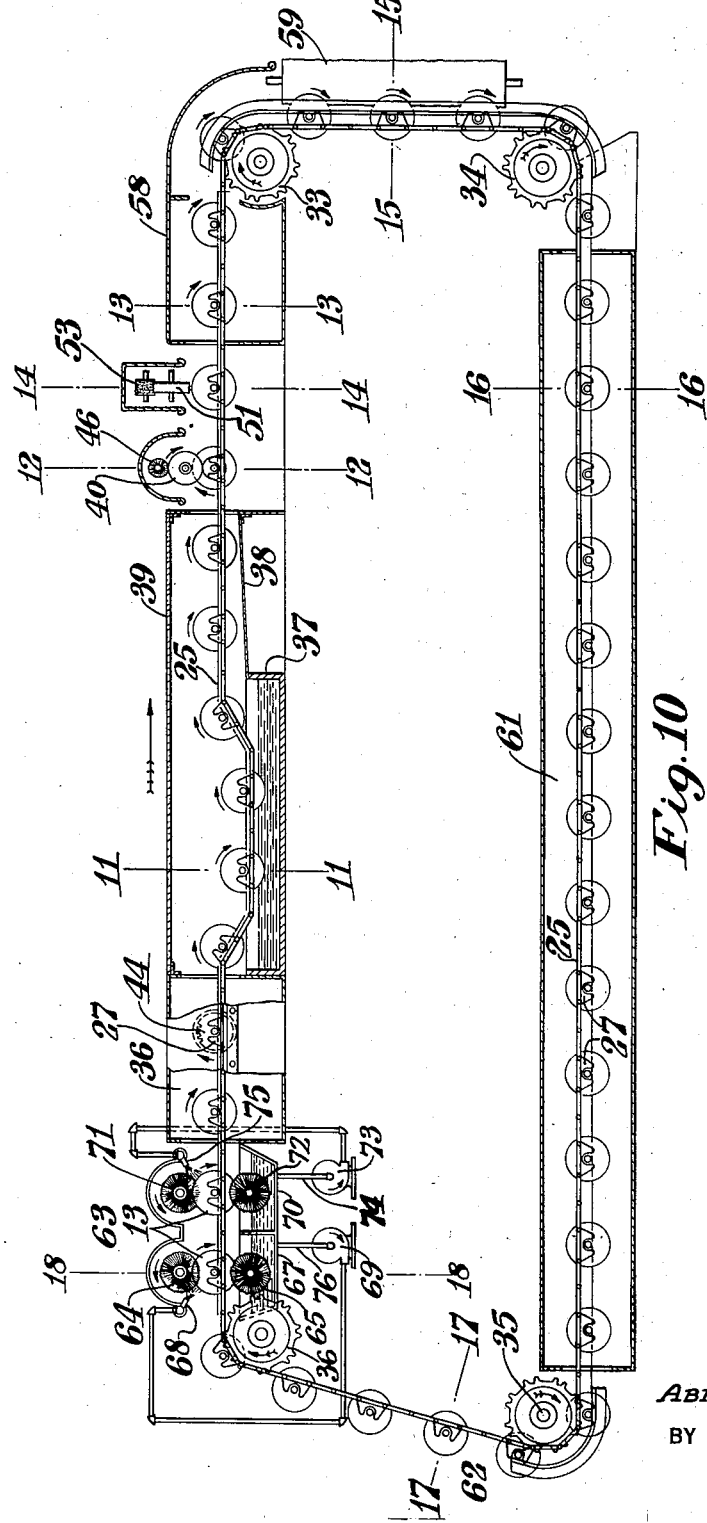

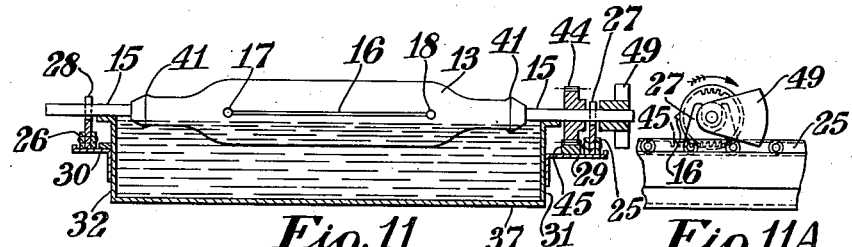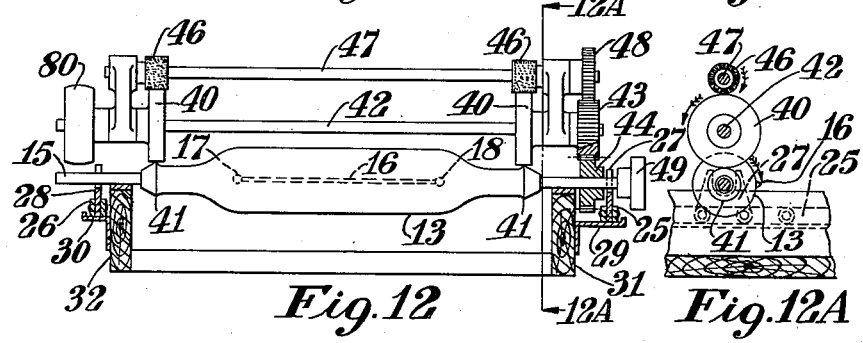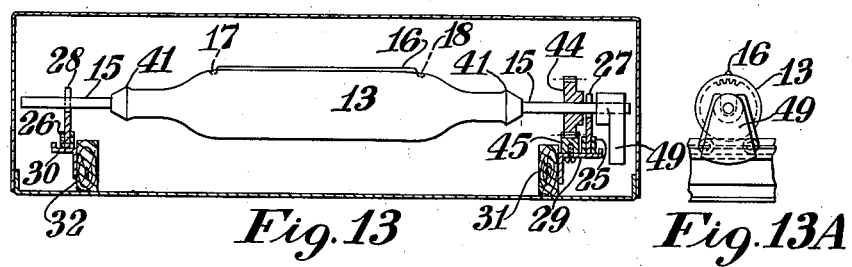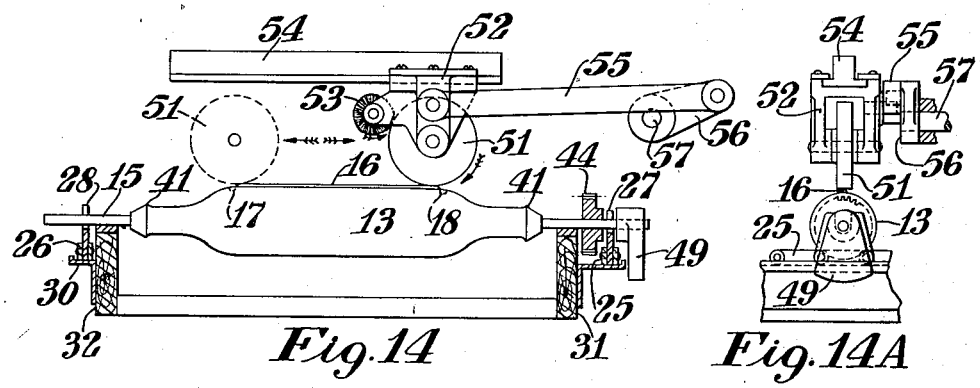

Nov. 30, 1937.  A. N. SPÁNEL  2,100,571
METHOD OF AND APPARATUS FOR MAKING RUBBER OR LATEX ARTICLES
Original Filed Aug. 10, 1933   5 Sheets-Sheet 5
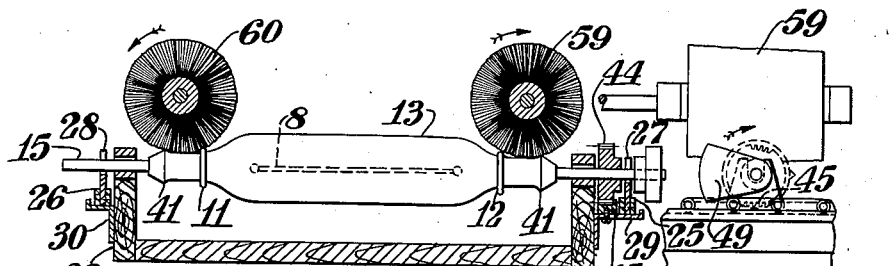
*Fig.15*  *Fig.15A*
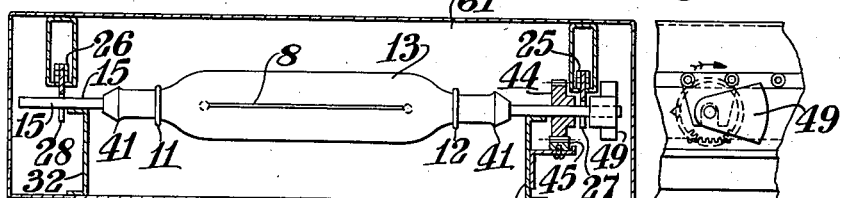
*Fig.16*  *Fig.16A*
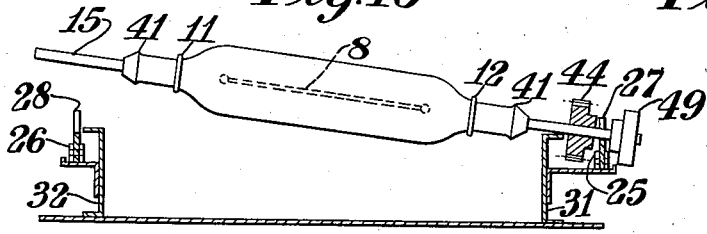
*Fig.17*
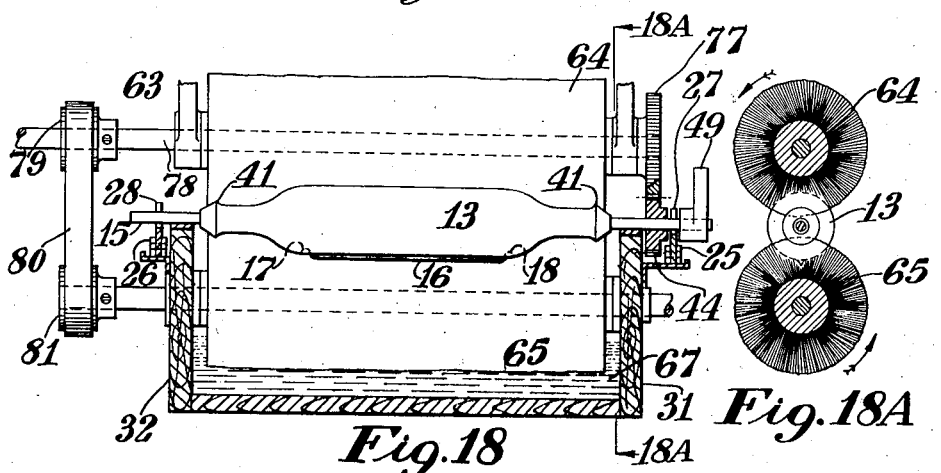
*Fig.18*  *Fig.18A*
INVENTOR
ABRAHAM N. SPÁNEL
BY D. Clyde Jones
ATTORNEY Patented Nov. 30, 1937

2,100,571

UNITED STATES PATENT OFFICE 2,100,571

METHOD OF AND APPARATUS FOR MAKING RUBBER OR LATEX ARTICLES

Abraham N. Spánel, Rochester, N. Y.

Application August 10, 1933, Serial No. 684,547
Renewed June 18, 1936

8 Claims. (Cl. 18—41)

This invention relates to sanitary pad shields or the like, and to the method of and to apparatus for making the same.

The usual sanitary pad is formed of a fibrous substance such as cotton or some form of absorbent cellulosic material enclosed in a loosely woven strip of cloth which is of rather coarse texture and therefore, tends to chafe the wearer's legs and although such pads are bulky they do not afford complete protection to the garments of the wearer.

In accordance with one feature of the present invention, a sanitary pad shield is provided which is formed of soft flexible water-proof material which prevents the mentioned irritation and which affords complete protection to the garments of the wearer even though the thickness of pad and therefore its bulk, is reduced.

A further feature of the invention relates to forms on which shields may be deposited from a rubber solution.

Still another feature of the invention relates to a continuous method for commercially manufacturing sanitary pad shields or the like in large quantities.

Figure 1:
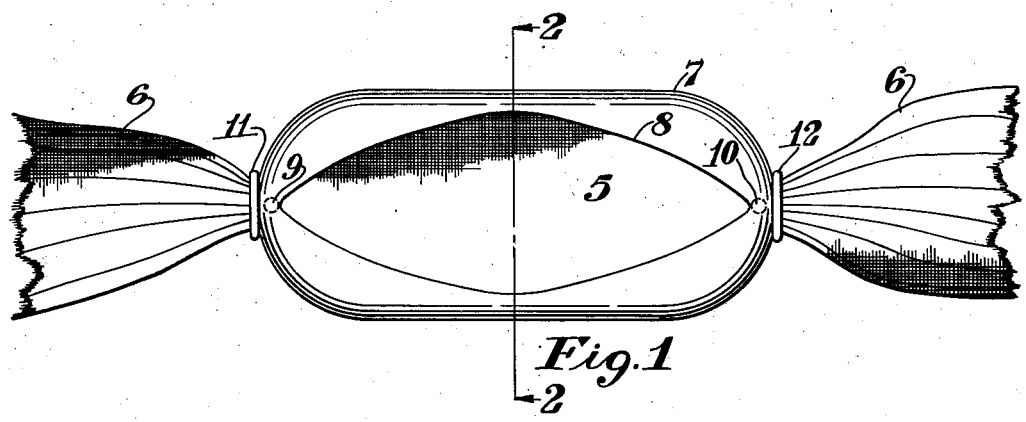
Figure 2:
Figure 3:
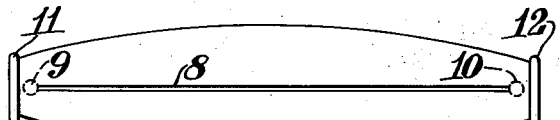

These and other features of the invention will appear from the detailed description and claims when taken with the drawings, in which Fig. 1 illustrates a top view of the shield of the present invention applied to a sanitary pad; Fig. 2 is a cross sectional view thereof taken on the line 2—2 of Fig. 1; Fig. 3 is a top view of a sanitary pad shield before it has been applied to a sanitary pad; Figs. 4 and 4A, Figs. 5 and 5A, Figs. 6 and 6A, Figs. 7 and 7A, Figs. 8 and 8A, as well as Figs. 9, 9A and 9B respectively illustrate side and end views of different shapes of forms which may be utilized in manufacturing the shields of this invention; Fig. 10 is a general showing of a system in which the shields may be made according to a continuous method; Fig. 11 is a cross sectional view taken generally on the section line 11—11 of Fig. 10 and Fig. 11A is an enlarged end view of the structure thereof illustrating a form being dipped into the rubber solution while rotating on its horizontal axis; Fig. 12 is a cross sectional view taken substantially on the section line 12—12 of Fig. 10 and Fig. 12A is an enlarged sectional end view of the structure in this figure showing how the ends of the layer or film of latex deposited on the rotating forms are parted or trimmed therefrom; Fig. 13 is a cross sectional view taken substantially on the section line 13—13 of Fig. 10 and Fig. 13A is a detailed end view indicating how the form is rotated slowly while it is being advanced through a drying oven; Fig. 14 is a cross sectional view taken substantially on the section line 14—14 of Fig. 10 and Fig. 14A is a detailed end view illustrating the manner in which the shield is parted longitudinally for the major portion of its length to provide an elongated opening therein; Fig. 15 is a cross sectional view taken substantially on the line 15—15 of Fig. 10, which view when taken with the enlarged end view in Fig. 15A illustrates how the ends of the shield while rotating are ring-rolled on the form; Fig. 16 is a cross sectional view taken substantially on the line 16—16 of Fig. 10 and Fig. 16A is a detailed end view indicating the manner in which the forms with the shields thereon, are rotated while being progressively advanced through the curing oven; Fig. 17 is a cross sectional view taken substantially on the line 17—17 illustrating how the forms with the shields thereon may be taken off from the yokes on the endless chains so that the shield can be removed or stripped from the form; Fig. 18 is a cross sectional view taken substantially on the line 18—18 of Fig. 10 and Fig. 18A is an end view thereof illustrating the manner in which the forms after having the shields stripped therefrom are properly cleansed, before they are again used in repeating the cycle of operation.

In Fig. 1, 5 designates a sanitary pad made of absorbent fibrous substance such as cotton or cellulosic material enclosed in a strip of cloth 6 of rather open weave. This figure also illustrates a film-like shield 7 of the present invention applied to a sanitary pad with the ends of the enclosing cloth 6 extending through openings in the end of the shield. This shield which is generally tubular in shape and which is composed of soft flexible water-proof material preferably formed of dipped rubber or latex or other suitable waterproof substance, has an opening or slit 8 in one of its walls to expose a portion of one flat surface of the pad, the ends of this opening being strengthened against tearing by reinforcements 9 and 10 formed as thickened deposits in the material of the body of the shield. In each of the ends of the shield there is provided an opening to receive the ends of the cloth strip 6 which openings are reinforced at 11 and 12 such as by a thickened edge of the deposited rubber or by rolling the margin thereof about these openings back upon itself to provide a ring-rolled reinforcement. It will be understood that the reinforcements 9 and 10 for the ends of the opening 8 may be omitted and instead the ends of this opening can be reinforced by the reinforcements 11 and 12.

Although the shield of the present invention is not limited to any particular method of manufacture, it is preferred to make it by dipping a form 13, rotating horizontally on its major axis, into a rubber solution or a water dispersion of rubber commonly known in the art as latex.

Figure 4:
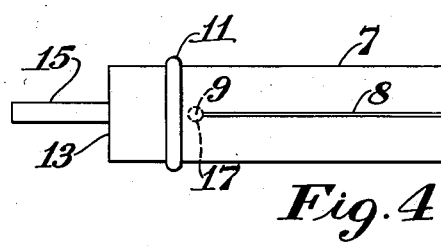
Figure 4A:
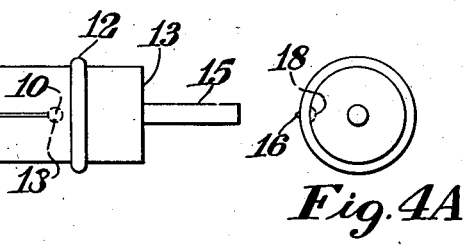

This form 13 may be made of glass or metal such as aluminum and may be of any one of numerous shapes, a few of which possible shapes are indicated in Figs. 4 to 9B inclusive and Fig. 11. As shown in Figs. 4 and 4A, the form 13 is a cylinder provided on its curved surface with a rib 16 having a relatively sharp edge extending parallel to the major axis of the form, and with depressions 17 and 18 at the ends of the rib. A removable axle 15 located at the major axis of the form with its ends projecting therefrom, serves to support the form in a horizontal position while it is being dipped. On the surface of this form there is indicated a shield 7 of which the ends have been rolled back upon themselves to provide ring-rolled reinforcements 11 and 12 for the end openings therein. The rib 16 is utilized, as will be hereinafter set forth, in parting the layer of the shield to provide a longitudinal opening or slit 8 in the shield, while the depressions 17 and 18 serve to collect a thickened portion in the shield layer to provide the reinforcements 9 and 10 for the ends of this slit.

Figure 5:
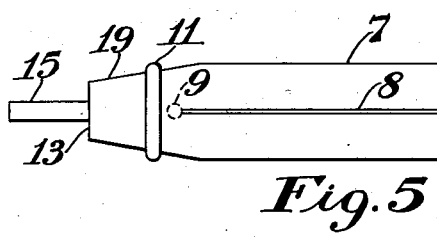
Figure 5A:
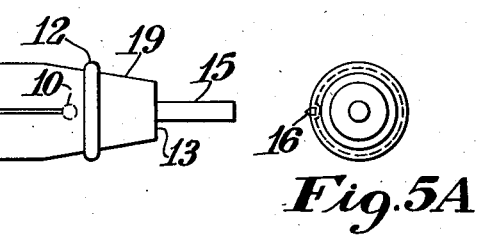
Figures 6, 6A:
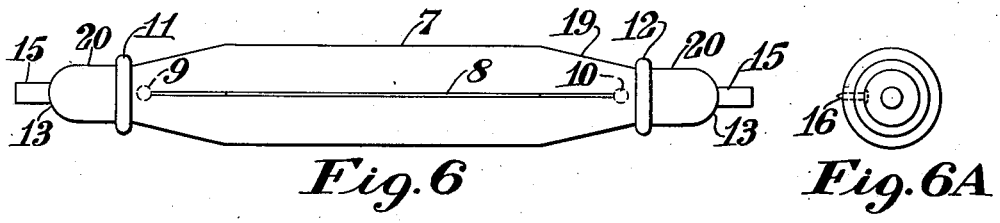

The form shown in Figs. 5 and 5A, differs from that shown in Figs. 4 and 4A in that the ends thereof are tapered as indicated at 19, which shape provides a shield in which the end openings are materially less in diameter than the diameter of the main portion of the shield. The form shown in Figs. 6 and 6A differs slightly from the form shown in the last two figures, in that, in addition to the tapered portions 19, there is provided end portions 20, the main surfaces of which are parallel to the major axis of the form, so that the end margins may be rolled back easily upon themselves.

Figures 7, 7A:
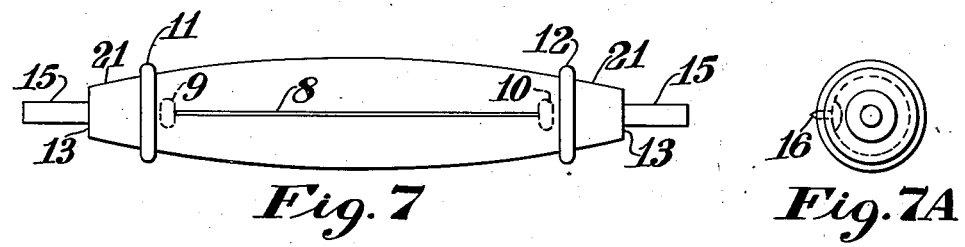

The form illustrated in Figs. 7 and 7A, while generally cylindrical in shape, is generated by rotating the arc 21 of a relatively large circle about an axis. The form shown in Figs. 8 and 8A differs from the form just referred to, in that, in addition to the curved surface 21, there is provided at each end of the form, a cylindrical portion 22 of circular cross section and terminating in beveled ends 23.

Figures 8, 8A:
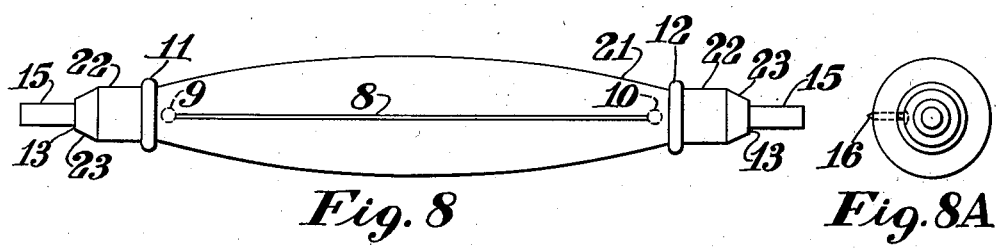
Figures 9, 9A, 9B:
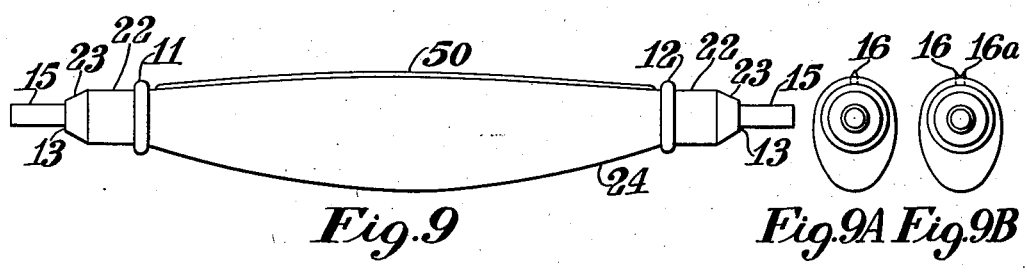

The form disclosed in Figs. 9, 9A and 9B is similar to that disclosed in Figs. 8 and 8A, but differs therefrom in that the main body portion 24 of the form has a shape as indicated in Figs. 9A and 9B. As illustrated in Fig. 9B instead of utilizing one long longitudinal rib 16, two spaced ribs 16 and 16a are employed so that a strip may be removed from the deposited layer to provide a wider slit 8 in the finished shield.

In the production of the shield in large quantities, however, it is preferred to effect the various steps of the method according to the arrangement illustrated in Fig. 10 wherein, as shown in detail in Fig. 11, two spaced endless chains 25 and 26 are provided with a series of yokes 27 and 28 to support the axles 15 of a series of forms 13 in horizontal position therebetween and to advance them progressively in an endless path. These chains are continuously moved along a pair of endless tracks or guides 29 and 30 mounted on suitable upright parts of the installation such as 31 and 32, the chains being driven by suitable pairs of sprockets 33, 34, 35 and 36 which are continuously rotated by any suitable means (not shown). During certain operations occurring in the course of the cycle of making a shield it is necessary to rotate the form 13 on its major axis and for this purpose a gear 44 on the axle 15, on which the form is mounted to move as a unit therewith, engages a stationary toothed rack 45 mounted on or adjacent guide 29 while during other operations of the cycle, the rack 45 is omitted so that the form does not rotate at that time.

With this brief description of the installation, it is believed that the method will best be understood by describing the various steps involved in making the shields.

At 36' there is indicated a form drying oven through which the forms are advanced after they have been suitably washed and cleaned as will hereinafter be set forth. From this oven the pair of endless chains 25 and 26 carrying the forms in their yokes 27 and 28, move down an inclined portion and then along a horizontal portion of the guides with the gears 44 on the respective forms engaging the rack 45 to rotate them so that a substantial portion of the lower surface of each rotating form at this stage is dipping into a tank 37 containing liquid rubber of which the shield is made (Figs. 11 and 11A). These forms while still rotating continue to progress through the tank while making several rotations until a layer of the desired thickness of the deposited rubber is formed on the surface thereof. A section of the pair of endless chains is now elevated by means of an upwardly inclined portion of the guides so that the forms carried thereby although they are still rotating no longer dip into the liquid rubber such as an aqueous dispersion of rubber, commonly known as latex. From this point the endless chains carry the rotating forms horizontally over a drain board 38 on which the excess liquid rubber drips from the rolls. It is preferred to protect the liquid rubber from dust particles, and for this purpose a glass cover 39 is provided for the tank and the drain board compartment.

In the endless method here outlined, it is preferred at this point in the advance of the endless chains 25 and 26, after the layer of film is deposited or partly dried, to squeeze off or trim away the excess rubber at the ends of the form and for this purpose, as best shown in Figs. 12 and 12A, suitable rotating rubber rolls 40 engage the sharp parting ridge 41 at each end of the form. It will be understood that the rubber rolls 40 are mounted on a shaft 42 which is rotated continuously by pulley 80 from a source of power (not shown). Gear 43 secured to shaft 42 in turn drives the gear 44 mounted on the removable axle 15 of each form 13 in succession so that not only the rolls 40 but also the form in operative relation thereto, are rotated. Since it is necessary to keep the periphery of the rubber roll 40 clean, a pair of rotating brushes 46 engage the surfaces of these rubber rolls to brush away any adhering particles of rubber. These brushes are mounted on a shaft 47 driven by a gear 48 which meshes with the rotating gear 43.

As the pair of chains continue to advance the forms from the end trimming or end parting stage, the gear 44 is no longer in engagement with rack 45 so that the counterweight 49 attached to the axle swings to its lowest position as shown in Figs. 13 and 13A, thereby rotating the form until the sharp longitudinal ridge 16 thereon is, in its uppermost position. At this stage in the operations, one wall of the shield is slit or parted longitudinally for a portion of its length and for effecting this result there is provided a rubber roller 51 mounted on carriage 52 which is reciprocated on stationary track 54 to move the rubber roll back and forth along the sharp ridge 16 on the form. A suitable brush 53 which engages the periphery of the roll 51 serves to keep this roll clean. While the carriage 52 may be moved back and forth on the track 54 by any suitable reciprocating means, as herein shown, it is driven by a reciprocating bar 55 pivoted at one end to the carriage and at the other end thereof to an eccentric 56 which is actuated by a constantly rotating shaft 57.

From the end parting and from the longitudinal slitting stage, the forms bearing the deposited layer, now advance into the dryer 58 wherein they are continuously rotated slowly by means of the gears 44 carried thereby, which gears now engage the stationary rack 45. After leaving the drying oven the forms advance to a point where the trimmed edges of the shields thereon are turned back on themselves or ring-rolled, as indicated in Figs. 15 and 15A, by brushes 59 and 60 which are continuously rotated in the direction of the arrows by any suitable means (not shown).

Following the ring-rolling operation, the shield-bearing forms while being rotated by means of the gears 44 thereon in engagement with the rack 45, advance into a curing oven 61 (Figs. 16 and 16A) which is maintained at a suitable temperature to cure the shields that have been deposited and manipulated according to the various operations, just described. On leaving the curing oven, the endless chains advance the forms 13 (not rotating at this time) with the cured shields thereon to a station designated 62 where an operator lifts the forms one at a time from their respective pairs of yokes (Fig. 17) and withdraws the axles 15 therefrom. The shield can now be stretched over one end of the form until this end can be withdrawn through the slit 8. Thereafter, it is possible to strip the remainder of the shield from the other end of the form, easily.

When the shield has been removed from the form, the axle 15 is replaced in the end of the form and the operator restores it to an empty pair of yokes 27 and 28 on the endless chains so that the form continues to advance to the washer 63. This washer includes two constantly rotating brushes 64 and 65 which engage respectively the upper and the lower surfaces of a form 13 (Figs. 18 and 18A). As herein shown the shaft 78 carrying the brush 64 is driven from any suitable source of power (not shown) and is provided with a gear 77 meshing with the gear 44 on the axle of the form to rotate it. A pulley 81 on the shaft of brush 65 is driven by a belt 80 from the pulley 79 in shaft 78. It will be noted that the brush 65 rotates in a tray 67 of soapy water while a spray of the soapy water is forced through suitable nozzles 68 along the whole surface of the form by means of a pump 69 connected in a pipe 76 leading from the tray to the nozzles. The form now advances over a fresh water tray 70 with which there are provided constantly rotating brushes 71 and 72 (actuated in a manner similar to that indicated in Fig. 18) to engage respectively the upper and lower sides of a form 13 of which brush 72 dips into the fresh water in the tray. Similarly a pump 73 connected in a pipe 74 forces fresh water from the tray through the nozzles 75 against the entire length of the form.

After being suitably washed and rinsed the forms are advanced by the endless chains into the form-drying oven 36' from which they emerge to repeat the cycle of operations already described.

It should be pointed out that the end trimming or parting of the deposited layer as illustrated in Figs. 12 and 12A, can be effected either before or after this layer has been dried in the oven 58. Also the deposited layer can be slit or parted lengthwise either before or after the deposited layer has been dried in the oven 58, or this parting of the layer can be effected after the curing thereof and can be accomplished in the manner illustrated in Figs. 14 and 14A or by shearing, die cutting and other ways well known in the art.

It will be understood by skilled artisans that the rubber may be vulcanized in any suitable way either before or after depositing the same on a form to produce the shield.

The present disclosure is given merely by way of example, and not in a limiting sense, for there may be many modifications and variations thereof within the scope of the appended claims without departing from the spirit of the present invention.

What I claim is:

1. The method of making a shield for a sanitary pad or the like which comprises dipping a progressively moving form into liquid rubber or the like to deposit a layer of the rubber thereon, providing an opening in each end of the deposited layer, and forming an elongated opening in one side wall of said deposited layer during its progressive movement.

2. The method of making a shield for a sanitary pad or the like which comprises rotating a form on a horizontal axis with said form dipping into liquid rubber or the like to deposit a layer of the rubber thereon, providing an opening in each end of the deposited layer, and forming an elongated opening in one side wall of said layer.

3. The method of making a sanitary pad shield or the like, which comprises advancing a series of forms in an endless path, rotating each form while dipping into liquid rubber or the like to deposit a layer thereon, trimming the ends of the deposited layer on the form, parting a portion of the deposited layer lengthwise of the form, drying the deposited layer, and removing the shields from the form.

4. The method of making a sanitary pad shield or the like which comprises advancing a series of forms in an endless path, rotating each form on a horizontal axis while dipping into liquid rubber or the like to deposit a layer thereon, trimming the ends of the deposited layer on the form while it is being rotated, parting a portion of the deposited layer lengthwise of the form drying the deposited layer on the form, and removing the shield from the form.

5. The method of making a sanitary pad shield or the like which comprises rotating a cylindrical form on a horizontal axis while dipping the periphery of the form into liquid rubber or the like to deposit a layer thereon, trimming the deposited layer while on the rotating form, slitting the layer on the form lengthwise thereof; advancing the form and its deposited layer through a drying oven, and removing the shield from the form.

6. A form for making a dipped shield for a sanitary pad or the like, which form has an elongated portion rounded in cross section and terminating at each end in a reduced portion, said elongated portion being provided on its surface with a raised part having a relatively abrupt edge extending parallel to the major axis of the form, and means at each end of the raised part to accumulate a reinforcement of liquid rubber and means at each end of the form whereby it may be supported with its major axis in a horizontal position.

7. The method of making a latex article which comprises providing a form of approximately the desired outline of said article, depositing a layer of latex on said form, simultaneously accumulating spaced reinforcing masses of latex in said layer, and parting said layer from one of said masses to the other.

8. A form on which a layer of latex comprising a latex article can be deposited, said form having approximately the outline of said article, means at spaced points on said form for accumulating reinforcing lumps of latex in said article, and means on said form extending between said first mentioned means cooperating in developing the separation of the layer between said reinforcements.

ABRAHAM N. SPÁNEL.